Patented Oct. 25, 1949

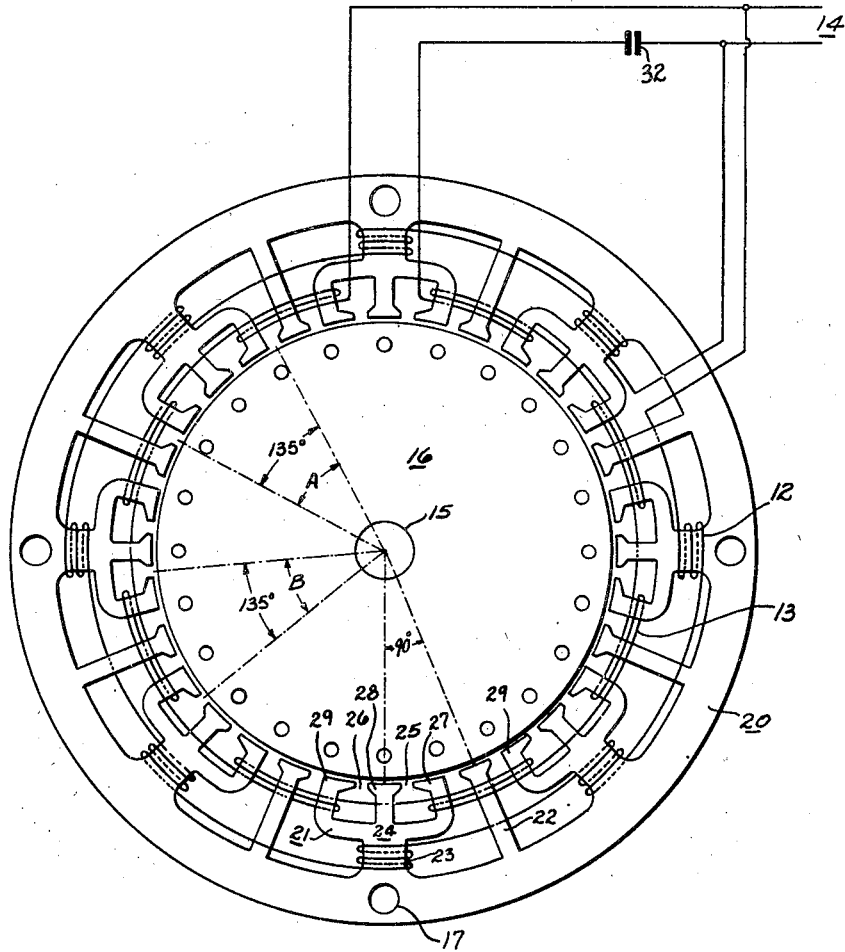

2,485,628

UNITED STATES PATENT OFFICE 2,485,628

INDUCTION MOTOR PRIMARY CONSTRUCTION

Wayne J. Morrill, Fort Wayne, Ind.

Application August 9, 1947, Serial No. 767,816

8 Claims. (Cl. 318—220)

My invention relates in general to electric motors and more particularly to the stator for electric motors.

An object of my invention is to provide for economically producing motors having a large number of poles. Because of the large number of poles and the relatively confined space for each pole, it is necessary to devise a stator structure of simple form which permits of the use of short pitched coils on both the main and starting windings. By pitch is meant the effective magnetic span of the coil referred to the pole face, the effect being produced in my invention either by electrical spacing or by magnetic configuration. In considering the two methods of short pitching which are used in my motor, it is well to point out that while both windings are so placed as to produce the effect of a 75% electrical pitch, the main winding is short pitched mechanically more than it is short pitched electrically due to the shape of the magnetic structure employed. The arrangement which I have devised allows the use of approximately 75% pitched coils in both main and starting phases, the coils in one phase being spaced substantially 90 electrical degrees from those of the other phase. The short pitching is accomplished on the main winding phase by the use of a magnetic configuration, whereas the short pitching of the starting winding phase is accomplished by the disposition of the starting winding in slots which electrically produce the same result. When windings are so placed there exists for each pole pitch of each phase, stator teeth which are unexcited by that particular phase. An unexcited tooth of a pole face of one phase lies substantially in the middle of the next adjacent pole face of the opposite phase.

Another object of my invention is to separate the main and starting windings mechanically into two separate, radially disposed concentric planes in such a way that while the windings overlap electrically, they do not contact each other mechanically and, therefore, the placing of one winding is free from interference by the placing of the other winding. In this way no insulation is required between the phases as is customarily considered good design in split phase or two phase motors.

Another object of my invention is the provision of a design which makes it possible to produce economically slow speed motors such as are required for directly driving fans and other similar types of loads which must otherwise be driven by means of high speed motors connected through belts or gear speed reducers. By the use of such direct drive motors, it is possible to produce longer blade fans which are quieter in operation, better in appearance and performance, and are more free from the necessity of servicing than are belt driven fans. Heretofore, it has generally been considered uneconomical to directly drive the larger size of fans because of the excessive cost of slow speed motors for such purposes.

Another object of my invention is a stator construction which permits the coils to be wound by high speed automatic winding machines. Due to the simplicity of the stator structure which I have devised, it is possible to insert one or both windings by means of high speed automatic gun type winding machines which wind the wire neatly and directly into place without the use of manual labor. If desired, this type of structure permits the simultaneously winding of all the poles of either phase without any interference with the mechanical operation of winding. The resulting increase in speed in winding the coils by automatic machines reduces the actual labor by as much as 90% as compared with hand winding methods.

Another object of my invention is that, when used in connection with automatic machine winding, the windings are wound so snugly into place that other finishing operations frequently required to insure against detrimental movement of the wires, become unnecessary. In addition, due to the snugness of the windings, appreciably less copper is required to accomplish a given result. In this latter connection, the short pitch of both windings, and especially that of the main winding, contribute further to the saving in copper. The short pitch of both windings, in addition to electrical advantages which will be mentioned later and the copper advantages which have just been described, has the further advantage of shortening the span of the inner end wire, of the coils making it easier to automatically wind the wire in place without the use of auxiliary appurtenances to hold the end wire out of the air gap region.

Another object of my invention is to so distribute the coils as to substantially eliminate the third and fifth space harmonics from both phases. If this were not done there would be strong tendency or the production of objectional torque dips which would tend to stick the motor at low speeds and the harmonics would cause a negative torque drag at normal operating speeds. The proposed structure causes a greater diminution of the magnitudes of the third and fifth harmonics through the use of 75% pitches in both windings.

Other objects and fuller understanding of my invention may be had by referring to the following description and claims, taken in conjunction with the single figure of the drawing, which shows a stator having eight poles and having a main winding 12 and a starting winding 13 energized from an alternating current supply source 14. The stator frame has not been shown but it will be understood that the magnetic stator core may be constructed of stacked laminations arranged to be suitably supported in a frame having end bearings rotatively supporting a shaft 15 of the rotor 16. The openings 17 in the stator laminations are to accommodate holding rivets or bolts to secure the laminations in an assembled units.

In the drawing I show a condenser 32 in the starting winding circuit, although it should be understood that other means of modifying the phase in the starting winding circuit may be employed, such for example the phase splitting may be accomplished by the difference in the characteristics of the windings themselves or by the use of an external resistance. Also, the starting winding may be automatically operated by a switch to open the winding circuit as the motor comes up to speed.

The magnetic core comprises an outer annular yoke portion 20 and alternately arranged teeth 21 and 22 respectively projecting inwardly from the outer portion 20 and terminating in faces to define an opening for the rotor. The construction of the teeth 21 are identical and the construction of the teeth 22 are identical. The outer annular portion 20 constitutes a bridge or yoke between the teeth whereby the flux may flow out of one pole through the stator, back into another pole, and then through the annular or bridge portion 20 to the original pole to complete the cycle.

The teeth 21 each comprise a narrow section 23 and a wide section 24. The narrow sections each extend inwardly from the outer yoke portion 20 and terminate in the wide section 24. The coils of the main windings are wound around the narrow sections 23. The wide sections 24 each have first and second slots 25 and 26 extending outwardly from the face thereof and provide first, second and third teeth 27, 28 and 29 which in combination with the narrow section 23 associated therewith constitute the magnetic paths for the flux established by the coils of the main winding 12. The coils of the starting winding 13 fit in the slots of the wide sections 24, each such coil surrounding and magnetizing the tooth 22 and the first and third teeth 27 and 29 respectively of the adjacently disposed wide section 24 on opposite sides of the tooth 22. The fundamental magnetic pole face for the main winding, which embraces 180 electrical degrees includes the three teeth 27, 28, 29 of the wide section and extends circumferentially on both sides thereof to the middle of the tooth 22. The fundamental magnetic pole face for the starting winding, which embraces 180 electrical degrees includes the teeth 27, 22 and 29 and extends circumferentially on both sides thereof to the middle of the tooth 28. The tooth 22 of each main pole face is unexcited by the main winding and the tooth 28 of each starting pole face is unexcited by the starting winding. Thus each pole face for the main and starting windings respectively comprises four teeth, but only three are excited. The three excited teeth 27, 28 and 29 constitute the pole pitch for the main winding and embraces 135 electrical degrees as shown by the angle A. The three excited teeth 27, 22 and 29 constitute the pole pitch for the starting winding and embraces 135 electrical degrees as shown by the angle B. Thus, for both winding phases, the magnetic span for each coil referred to the pole face is 75 percent, which represent an effective pole pitch of 135 electrical degrees. The magnetic span for the main phase is accomplished by the magnetic configuration of the teeth 21, and each coil of the main winding is short-pitched mechanically more than it is short-pitched electrically. The short-pitching for the starting phase is produced by electrical spacing of the coils, each embracing three teeth 27, 22 and 29. The magnetic spans of the main phase are spaced substantially 90 electrical degrees from those of the starting phase. The magnetic span for each coil of the main phase and the magnetic span for each adjacently disposed coil of the starting phase have a common tooth or core portion. Thus, the tooth 27 is common to the excited teeth constituting the main magnetic span; namely, the teeth 29, 28 and 27 of one wide section, and the tooth 27 is also common to the excited teeth constituting the starting magnetic span; namely, the teeth 27, 22 and 29, the latter being a tooth of the next adjacently disposed wide section. The width of the narrow section 23 is substantially equal to and may be slightly less than the total width of the three teeth 27, 28 and 29 of the wide section 24.

The main and starting windings are mechanically separated into two radially disposed concentric planes, so that notwithstanding the fact the windings overlap electrically, they do not mechanically contact each other. Therefore, the placing of one winding is free from interference by the placing of the other winding. In this way no insulation is required between the main and starting windings as is customarily considered good design in split-phase or two-phase motors. As pointed out hereinbefore, the main and starting windings may be wound by means of high-speed automatic gun-type winding machines which wind the wire neatly and directly into place without the use of manual labor. All of the coils of the main windings are first wound simultaneously by the automatic gun-type winding machine, after which all of the coils of the starting windings are simultaneously wound. The high-speed automatic gun-type winding machine wraps the coils for each phase simultaneously by employing a needle arm for each coil, which needle arm is automatically moved in a wrapping fashion around the magnetic structure about which the coil is wound. Specifically, the needle arm, when winding a coil of the main phase around the narrow section 23, would move, for example, downwardly in the space between the narrow section 23 and an adjacently disposed tooth 22, then circumferentially under the narrow section and then up between the narrow section 23 and an opposite tooth 22, and then circumferentially across the top of the narrow section, which completes the cycle of the winding loop. A needle in winding the coil about the starting phase would, for example, move downwardly in the slot 25 of one wide section 24 and then circumferentially under the three teeth 27, 22 and 29 and then upwardly in the slot 26 in the next adjacently disposed section, and then circumferentially above the teeth 28, 22 and 27, which completes the cycle of one turn of the coil.

The windings may be wound so snugly in place that other finishing operations frequently required to insure against detrimental movement of the wire becomes unnecessary. The snugness of the windings results in the use of less copper for accomplishing a given result. In addition, the short pitch of both the main windings and the starting windings contribute further to the saving of copper. It is to be noted that the short pitching of the windings makes it easier to automatically wind the wires in place without the use of auxiliary devices to hold the end wires out of the air gap region. By the use of high speed automatic gun-type winding machines, I find that the resulting increase in speed in winding the coils reduces the actual labor as much as 90 per cent as compared with hand winding methods.

It is further noted that with my design it is possible to provide for economically producing motors having a large number of poles within a relatively confined space. One reason for my obtaining a large number of poles in the confined space is that the short pitching on the main winding phase is accomplished by a magnetic configuration, whereas the short pitching on the starting winding phase is accomplished by the disposition of the starting windings in slots, plus the additional factor that the starting windings and the main windings are disposed in separate radially disposed concentric planes, whereby the windings may overlap electrically. Another advantage which I obtain in my invention is the fact that by employing short pitched windings for both the main and the starting windings, I am able to so distribute the coils as to substantially eliminate the third and fifth spaced harmonics of both phases. By my eliminating the third and fifth harmonics I am able to avoid the production of objectionable torque dips which would tend to stick the motor at slow speeds and which would tend to cause a negative torque drag at normal operating speeds. In other words, my design is such that I am able to produce a motor having a high efficiency torque as well as provide a large number of poles in a relatively confined space, plus the factor of eliminating the requirement for insulation between the main and starting phases of the motor, and further the structure is such that the coils may be automatically wound by a gun-type winding machine to save labor expense.

Although I have described my invention with a certain degree of particularity in its preferred form, it is understood that the present disclosure of the preferred form has been made only by way of example and that numerous changes in the details of construction and the combination and arrangement of parts may be resorted to without departing from the spirit and the scope of the invention as hereinafter claimed.

I claim as my invention:

1. A stator for an electric motor comprising a magnetic structure having an outer portion and at least first and second alternately arranged teeth projecting inwardly from said outer portion and terminating in faces, said first teeth each comprising a narrow section and a wide section, the narrow sections each extending inwardly from said outer portion and terminating in said wide section, a first winding having a coil on each said narrow sections for magnetizing said first teeth, said wide sections each having at least first and second slots extending outwardly from said face thereof and providing at least first, second and third teeth portions, said at least first, second and third teeth portions of each wide section and the narrow section associated therewith constituting magnetic paths for the flux established by the coils of the first windings, and a second winding having a plurality of coils each having coil sides fitting in the said slots of the wide sections, each coil of the second winding surrounding and magnetizing a second tooth and the first and third teeth portions respectively of the adjacently disposed wide sections of the first teeth.

2. A stator for an electric motor comprising a magnetic structure having an outer portion and at least first and second alternating arranged teeth projecting inwardly from said outer portion and terminating in faces, said first teeth each comprising a narrow section and a wide section, the narrow sections each extending inwardly from said outer portion and terminating in said wide section, a first winding having a coil on each said narrow sections for magnetizing said first teeth, said wide sections each having at least first and second slots extending outwardly from said face thereof and providing at least first, second and third teeth portions, said at least first, second and third teeth portions of each wide section and the narrow section associated therewith constituting magnetic paths for the flux established by the coils of the first windings, and a second winding having a plurality of coils each having coil sides fitting in the said slots of the wide sections, each coil of the second winding surrounding and magnetizing a second tooth and the first and third teeth portions respectively of the adjacently disposed wide sections of the first teeth, the width of the face for the second teeth and for each of the first, second and third teeth portions of the first teeth being substantially the same.

3. A stator for an electric motor comprising a magnetic structure having an outer portion and at least first and second alternately arranged teeth projecting inwardly from said outer portion and terminating in faces, said first teeth each comprising a narrow section and a wide section, the narrow sections each extending inwardly from said outer portion and terminating in said wide section, a first winding having a coil on each said narrow sections for magnetizing said first teeth, said wide section each having at least first and second slots extending outwardly from said face thereof and providing at least first, second and third teeth portions embracing substantially 135 electrical degrees, said at least first, second and third teeth portions of each wide section and the narrow section associated therewith constituting magnetic paths for the flux established by the coils of the first windings, and a second winding having a plurality of coils each having coil sides fitting in the said slots of the wide sections, each coil of the second winding surrounding and magnetizing a second tooth and the first and third teeth portions respectively of the adjacently disposed wide sections of the first teeth, said second tooth and the first and third teeth portions surrounded by a coil of the second winding embracing substantially 135 electrical degrees.

4. A stator for an electric motor comprising a magnetic structure having an outer portion and at least first and second alternately arranged teeth projecting inwardly from said outer portion and terminating in faces, said first teeth each comprising a narrow section and a wide section, the narrow sections each extending inwardly from said outer portion and terminating in said wide section, a first winding having a coil on each said narrow sections for magnetizing said first teeth, said wide section each having at least first and second slots extending outwardly from said face thereof and providing at least first, second and third teeth portions embracing substantially 135 electrical degrees, said at least first, second and third teeth portions of each wide section and the narrow section associated therewith constituting magnetic paths for the flux established by the coils of the first windings, and a second winding having a plurality of coils each having coil sides fitting in the said slots of the wide sections, each coil of the second winding surrounding and magnetizing a second tooth and the first and third teeth portions respectively of the adjacently disposed wide sections of the first teeth, said second tooth and the first and third teeth portions surrounded by a coil of the second winding embracing substantially 135 electrical degrees, said first and second windings being disposed in different radial concentric planes.

5. A stator for electric motor comprising a magnetic structure having an outer portion and having a plurality of substantially evenly spaced teeth, four adjacently disposed teeth embracing substantially 180 electrical degrees, a first winding and a second winding for magnetizing said teeth, magnetic section means projecting inwardly from said outer portion and magnetized by said first winding for magnetically interconnecting three teeth together as a first group, said second winding means electrically embracing three teeth together as a second group, said first group and said second group having a common tooth.

6. A stator for electric motor comprising a magnetic structure having an outer portion and having a plurality of substantially evenly spaced teeth, four adjacently disposed teeth embracing substantially 180 electrical degrees, a first winding and a second winding for magnetizing said teeth, magnetic section means projecting inwardly from said outer portion and magnetized by said first winding for magnetically interconnecting three teeth together as a first group, said second winding means electrically embracing three teeth together as a second group, said first group and said second group having a common tooth, said magnetic section means having a width less than 135 electrical degrees.

7. A stator for an electric motor comprising a magnetic structure having a bridge portion and at least first and second alternately arranged teeth substantially radially projecting from said bridge portion and terminating in faces, said first teeth each comprising a narrow section and a wide section, the narrow sections each extending substantially radially from said bridge portion and terminating in said wide section, a first winding having a coil on each said narrow sections for magnetizing said first teeth, said wide sections each having at least first and second slots extending away from said face thereof and providing at least first, second and third teeth portions, said at least first, second and third teeth portions of each wide section and the narrow section associated therewith constituting magnetic paths for the flux established by the coils of the first windings, and a second winding having a plurality of coils each having coil sides fitting in the said slots of the wide sections, each coil of the second winding surrounding and magnetizing a second tooth and the first and third teeth portions respectively of the adjacently disposed wide sections of the first teeth.

8. A stator for electric motor comprising a magnetic structure having a bridge portion and having a plurality of substantially evenly spaced teeth, four adjacently disposed teeth embracing substantially 180 electrical degrees, a first winding and a second winding for magnetizing said teeth, magnetic section means projecting substantially radially from said bridge portion and magnetized by said first winding for magnetically interconnecting three teeth together as a first group, said second winding means electrically embracing three teeth together as a second group, said first group and said second group having a common tooth.

WAYNE J. MORRILL.

REFERENCES CITED

The following references are of record in the file of this patent:

UNITED STATES PATENTS

| Number | Name | Date |
| --- | --- | --- |
| 2,124,427 | Morrill et al. | July 19, 1938 |